United States Patent [19]

House

[11] 4,100,145

[45] Jul. 11, 1978

[54] POLYMERIZATION OF 2-PYRROLIDONE WITH CATALYST PREPARED FROM THE REACTION PRODUCT OF $CO_2$ AND ANHYDROUS POTASSIUM PYRROLIDONATE

[75] Inventor: Ralph House, El Sobrante, Calif.

[73] Assignee: Chevron Research Company, San Francisco, Calif.

[21] Appl. No.: 636,200

[22] Filed: Nov. 28, 1975

[51] Int. Cl.$^2$ .............................................. C08G 69/24
[52] U.S. Cl. ........................... 528/312; 260/326.5 FL; 260/326.5 FN; 528/326
[58] Field of Search ............ 260/326.5 FL, 326.5 FN, 260/326.45, 78 P

[56] References Cited

U.S. PATENT DOCUMENTS

| | | |
|---|---|---|
| 3,309,343 | 3/1967 | Darnell et al. ..................... 260/78 L |
| 3,346,566 | 10/1967 | Chiddix et al. ............ 260/326.5 FN |
| 3,498,956 | 3/1970 | Birkner .............................. 260/78 L |
| 3,721,652 | 3/1973 | Barnes ................................ 260/78 P |
| 3,778,402 | 12/1973 | Kimura et al. ..................... 260/78 P |

*Primary Examiner*—Harold D. Anderson
*Attorney, Agent, or Firm*—Dix A. Newell; T. G. DeJonghe

[57] ABSTRACT

The process for preparing substantially anhydrous solid catalyst for the polymerization of 2-pyrrolidone includes the step of contacting equimolar amounts of an alkali metal hydroxide and 2-pyrrolidone.

3 Claims, No Drawings

POLYMERIZATION OF 2-PYRROLIDONE WITH CATALYST PREPARED FROM THE REACTION PRODUCT OF CO₂ AND ANHYDROUS POTASSIUM PYRROLIDONATE

BACKGROUND OF THE INVENTION

In the alkaline-catalyzed polymerization of 2-pyrrolidone, alkali metal hydroxides, particularly sodium and potassium hydroxides, have commonly been used as sources of alkaline catalyst. The reaction of the hydroxide with 2-pyrrolidone produces the alkali metal pyrrolidonate catalyst, and as a by-product, water. The reaction is believed to be represented by, e.g., for KOH, the following equation:

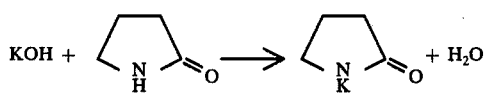

The reaction has been typically carried out in excess 2-pyrrolidone from which the water of reaction is then removed leaving a substantially anhydrous solution of alkali metal pyrrolidonate catalyst in 2-pyrrolidone. The anhydrous solution is then subjected to polymerization conditions. This may be termed the in situ method of catalyst preparation and polymerization.

Elevated temperatures can be used to effect dissolution of the hydroxide in 2-pyrrolidone and subsequent removal of water. But these conditions lend themselves to the hydrolysis of 2-pyrrolidone and subsequent interference by the hydrolysis products with polymerization (see U.S. Pat. No. 3,778,402). Consequently, the art teaches one to dissolve solid hydroxide, typically in the form of KOH pellets (85% KOH), in an excess of 2-pyrrolidone and to remove water under conditions of reduced pressure (see U.S. Pat. No. 3,721,652). The polymerization yield of polypyrrolidone and the polypyrrolidone molecular weight are extremely sensitive to monomer treatment. Hydrolysis of the sensitive 2-pyrrolidone ring, which is said to occur even under mild conditions of prolonged heating of aqueous 2-pyrrolidone, produces polymerization inhibitors which can depress the yield of polypyrrolidone (see U.S. Pat. No. 3,778,402). On the other hand, dehydration of 2-pyrrolidone, which is said to occur even under mild conditions of prolonged heating of anhydrous 2-pyrrolidone, produces polymerization activators which can cause "runaway polymerization" and the production of low-molecular-weight polypyrrolidone (see U.S. Pat. No. 3,184,476).

BRIEF SUMMARY OF THE INVENTION

A substantially anhydrous solid catalyst which effects the rapid polymerization of 2-pyrrolidone without runaway polymerization is made by reacting an alkali metal hydroxide with 2-pyrrolidone in equimolar amounts to produce an aqueous product mixture containing alkali metal pyrrolidonate, and drying said mixture to obtain substantially anhydrous solid alkali metal pyrrolidonate catalyst. The solid catalyst is typically used with a polymerization activator, such as CO₂, and monomer to produce polypryrrolidone more rapidly than 2-pyrrolidone catalyst solutions obtained by contacting hydroxide with excess 2-pyrrolidone.

BRIEF DESCRIPTION OF PREFERRED EMBODIMENTS

Catalyst Preparation

In the process of the present invention, 2-pyrrolidone is contacted with an alkali metal hydroxide in equimolar amount, at a temperature from about 20° C to about 200° C, preferably about 25° C. The essential criticality of the invention is that substantially equivalent amounts of hydroxide and 2-pyrrolidone are reacted to make the catalyst. Considering the stoichiometry of the reaction, this means that equimolar amounts of hydroxide and 2-pyrrolidone are contacted without the presence of an appreciable excess of either 2-pyrrolidone or hydroxide.

The reaction of 2-pyrrolidone and alkali metal hydroxide produces an alkali metal pyrrolidonate and water. The aqueous product mixture containing alkali metal pyrrolidonate is then subjected to drying conditions to produce a substantially anhydrous solid catalyst (alkali metal pyrrolidonate) for the alkaline-catalyzed polymerization of 2-pyrrolidone.

The preferred alkali metal hydroxides are sodium and potassium hydroxide. Potassium hydroxide is particularly preferred for its ease of dissolution in 2-pyrrolidone, as well as for the effectiveness of the catalyst produced from KOH. The hydroxide contacted with 2-pyrrolidone in equivalent amount in the process of the present invention may be a hydroxide in aqueous solution, or a water-containing solid hydroxide, or even an anhydrous hydroxide. Generally, the hydroxide will contain 0–90 weight percent of water and/or inert materials, preferably 0–50 weight percent water, and most preferably will be a solid hydroxide, either anhydrous or containing about 1–30 weight percent of water or water and inert material. Typically, commerically available KOH pellets of about 15 weight percent water, or water and inert materials such as potassium carbonate, are found to provide a highly suitable component for the inventive process.

The alkali metal hydroxide, for example potassium hydroxide pellets, is contacted with an equimolar amount of 2-pyrrolidone preferably with mixing at a temperature of from about 20° C to about 200° C, preferably about 25° C. The reaction proceeds spontaneously to produce the aqueous product mixture. If, for example, solid potassium hydroxide is used, the pellets will be observed to absorb an equimolar amount of the 2-pyrrolidone liquid over a period of a few minutes and become mushy-soft. Alternatively, an aqueous solution of the potassium hydroxide is stirred with an equimolar amount of the 2-pyrrolidone liquid. In any case, the aqueous product mixture is then subject to drying conditions until a substantially anhydrous solid product is obtained.

Drying conditions include temperatures ranging from below room temperature to elevated temperatures, typically about 15° C to 200° C, preferably about 25° C to 200° C, and most preferably about 25° C to about 150° C, and include pressures ranging from atmospheric to subatmospheric, typically 1–760 mm Hg, preferably 1–10 mm Hg, for periods including a few minutes to many days, typically 0.1–500 hours, preferably about 0.5–500 hours and most preferably about 1–24 hours. The solid product is usually ground to a powder before, or after, it is completely dry. For potassium pyrrolidonate, the anhydrous solid product typically weighs in at about 94–99% of theory.

Polymerization Conditions

The dry, solid catalyst is added to monomer in the amount of 0.5–30 mol percent, based on total 2-pyrrolidone; preferably about 5–20 mol percent, and most preferably about 10 mol percent, of the catalyst is used. The catalyst dissolves easily in 2-pyrrolidone to produce a solution of alkali metal pyrrolidonate in 2-pyrrolidone. Other alkaline catalysts, such as those derived from the reaction of lactams with tetraalkylammonium hydroxides, may also be added in amount such that the total catalyst does not exceed about 30 mol percent.

Polymerization then proceeds by adding a small, but effective, amount of a polymerization activator, such as an N-acyl pyrrolidone, $CO_2$, $SO_2$, etc., to the solution and heating at about 15°–100° C, preferably about 25°–70° C, and most preferably about 40°–60° C at subatmospheric to superatmospheric pressures for about 4–100 hours, preferably 8–72 hours, and most preferably 8–48 hours, under substantially anhydrous conditions. Usually about 0.1–5 mol percent, based on total 2-pyrrolidone, of a polymerization activator is used. The preferred amounts of $CO_2$ and/or $SO_2$, preferably $CO_2$, range from about 1 mol percent to about 5 mol percent, preferably about 3 mol percent, based on total 2-pyrrolidone. Total 2-pyrrolidone consists of 2-pyrrolidonate catalyst, 2-pyrrolidonate catalyst having formed an adduct with $CO_2$ or other activators, and monomer charged to the reactor for polymerization.

In order to produce high-quality poly-2-pyrrolidone capable of being formed into fibers, filaments and yarn of commercial textile quality, it is necessary that the 2-pyrrolidone monomer be of high purity. Depending upon the process of manufacture, commercially available 2-pyrrolidone may contain appreciable amounts of various impurities, some of which are believed to interfere deleteriously with polymerization. Purification of the monomer to polymerization grade is achieved by crystallization, distillation, distillation from boron oxide, etc., as disclosed in the literature.

The process of the present invention is just as applicable to polymers of C-alkyl-substituted pyrrolidone, such as 4-methyl-2-pyrrolidone, and copolymers of 2-pyrrolidone, such as with caprolactam, as to the production of poly-2-pyrrolidone. Consequently, in general, and unless otherwise indicated, the catalyst of the present invention will find use in the polymerization of 2-pyrrolidone, substituted 2-pyrrolidone, and any monomer capable of copolymerizing with 2-pyrrolidone under the stated conditions of alkaline polymerization catalysis.

Preparation of polymers of 2-pyrrolidone using the catalyst prepared by the process of the present invention can be carried out with various amounts of monomers, catalysts, inert nonsolvent liquids as in dispersion polymerization, initiators, activators and other additives — the amount of each being properly coordinated to produce the most effective polymerization. Although the preferred amounts of the components of the reaction have been given, it is to be understood that these are not intended to be limitations to polymerization, since it may be possible to effect substantial polymerization outside the preferred ranges.

EXEMPLIFICATION

The following examples are offered to illustrate preferred embodiments of the process of this invention. Examples 1–3 show the production of substantially anhydrous solid catalyst for the polymerization of 2-pyrrolidone by reacting equimolar amounts of potassium hydroxide and 2-pyrrolidone. Example 4 shows the polymerization of 2-pyrrolidone using these catalysts and a prior art catalyst.

EXAMPLE 1

85.05 g (1 mol) of purified 2-pyrrolidone was contacted with 65.88 g (1 mol) of 85% KOH pellets for 30 minutes, at which time a soft, solid mass was observed to have formed. The solid was then ground in a mortar to insure complete mixing. The solid was dried for about 16 hours at 65° C under 1–3 mm Hg vacuum and was found to have lost 10% of its weight (theory 18.5% water). The partially dried solid was reground in a mortar to facilitate drying, and after 90 additional hours of drying under the same conditions it was found to have suffered a total weight loss of 19.8%. The recovered product weighed 98% of theory and had an alkalinity of 8.07 meq/g (theory 8.13 meq/g).

EXAMPLE 2

8.54 g (0.1 mol) of purified 2-pyrrolidone and 6.63 g of 85% KOH pellets (0.1 mol) were combined as in Example 1. The product was dried at room temperature (about 25° C) at 1–3 mm Hg vacuum for 19 days. The dried product weighed 97% of theory and had an alkalinity of 7.41 meq/g (theory 8.13 meq/g).

EXAMPLE 3

8.58 g of purified 2-pyrrolidone and 6.60 g of 85% KOH pellets were combined as in Example 1 and dried at 130° C under 1–3 mm Hg vacuum for 1.5 hours. The dried product weighed 98% of theory and had an alkalinity of 7.46 meq/g.

EXAMPLE 4 a. A solid material composed of essentially equal molar amounts of $CO_2$ and potassium pyrrolidonate was prepared as described in U.S. Pat. No. 3,721,652 (Col. 5, lines 50–70). 1.76 g (0.0105 mol) of this material was dissolved in 30.0 g (0.352 mol) of 2-pyrrolidone at 95° C. Then 3.04 g (0.0247 mol) of potassium pyrrolidonate, prepared as described in Example 1, was dissolved in the 2-pyrrolidone and the resulting solution divided into 4 portions which were allowed to polymerize at 50° C. The polymerization of one sample portion was stopped after 2, 4, 8 and 22 hours, respectively. Each sample was worked up by washing the polymer with five 200-ml portions of water and then drying in a vacuum oven at 65° C for 16 hours. Conversion was determined from the weight of dry polymer based on the 2-pyrrolidone charged. The viscosity of the polymer was determined on a solution of 5.0 g of polymer in 100 ml of 88% formic acid using the Gardner-Holdt comparative viscosity method.

b. The same experiment was repeated except that the 3.04 g (0.0247 mol) of potassium pyrrolidonate was prepared as described in Example 2.

c. The same experiment was repeated except that the 3.04 g (0.0247 mol) of potassium pyrrolidonate was prepared as described in Example 3.

d. This polymerization was carried out using an "in situ" catalyst prepared in the usual way (see U.S. Pat. No. 3,721,652). A round-bottom flask, equipped with stirrer, gas inlet tube, thermometer and condenser was charged with 200 g (2.35 mols) of 2-pyrrolidone. To this was added 15.5 g (0.0235 mol) of 85% potassium hydroxide. The mixture was stirred until solution was complete and it was then heated under vacuum to remove water. When dry, the solution was cooled to about room temperature and 3.1 g (0.07 mol) of gaseous $CO_2$ was added to the solution. The resulting solution was divided into three parts which were allowed to polymerize for 4, 8 and 24 hours, respectively, at 50° C. The products were worked up essentially as described above.

The results of the above polymerizations are summarized in the following table.

TABLE

| | Polymerization of 2-Pyrrolidone | | | |
|---|---|---|---|---|
| | Mol % Conversion[1] | | | |
| Catalyst | 2 hrs | 4 hrs | 8 hrs | 22 hrs |
| Example | 18 | 30 | 44 | 72 |
| Example 2 | 13 | 27 | 43 | 69 |
| Example 3 | 12 | 27 | 40 | 67 |
| In situ[2] | — | 3 | 12 | 41 |

[1]Mol % conversion is $\frac{\text{mols polypyrrolidone}}{\text{total mols pyrrolidone}} \times 100$

[2]See Example 4(d)

The table illustrates the superior polymerizations achieved using the catalyst of the present invention compared to the prior art catalyst (Example 4(d)).

Not only does the substantially anhydrous solid catalyst give higher rates of conversion at each time interval, but the viscosity (which is related to molecular weight) of the polypyrrolidone was substantially the same as that produced by the in situ catalyst to within about ±15%. These results show that it is possible to double or triple the output of high-molecular-weight polypyrrolidone in equal time intervals by using the solid, substantially anhydrous catalyst produced from equimolar alkali metal hydroxide and 2-pyrrolidone instead of an in situ catalyst.

What is claimed is:

1. A process for polymerizing 2-pyrrolidone to produce polypyrrolidone capable of being formed into fibers which comprises contacting 2-pyrrolidone in a reaction vessel with a catalyst prepared by steps comprising reacting $CO_2$ with a potassium pyrrolidonate to obtain a $CO_2$ adduct thereof, wherein the potassium pyrrolidonate is prepared outside of the reaction vessel by steps comprising contacting and reacting potassium hydroxide with 2-pyrrolidone in equal molar amounts, in a reaction zone and in the absence of any appreciable excess of 2-pyrrolidone or potassium hydroxide above the equal molar amounts in the reaction zone, to produce an aqueous mixture and drying said mixture to obtain the potassium pyrrolidonate in substantially anhydrous form.

2. A process in accordance with claim 1 wherein the potassium hydroxide is a solid containing about 1 to 30 weight percent water or water and inert material.

3. A process in accordance with claim 1 wherein the amount of the catalyst used in the reaction vessel is 5–20 mol percent and the temperature for the contacting in the reaction vessel is 25°–70° C.

* * * * *